Figure 1:
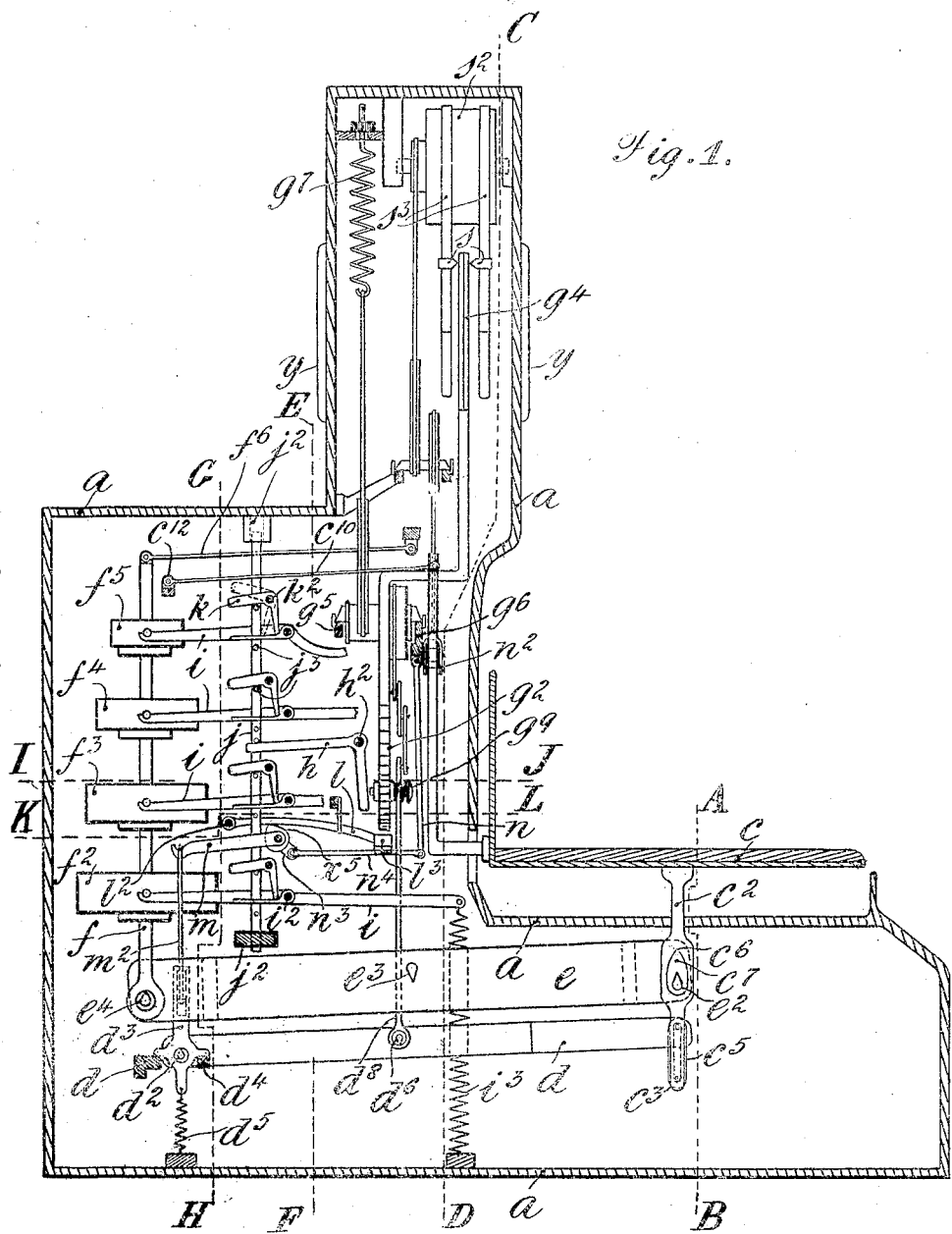

W. A. BENTON.
WEIGHT INDICATING WEIGHING APPARATUS.
APPLICATION FILED FEB. 24, 1913.

1,101,390.

Patented June 23, 1914.
7 SHEETS—SHEET 1.

W. A. BENTON.
WEIGHT INDICATING WEIGHING APPARATUS.
APPLICATION FILED FEB. 24, 1913.

1,101,390.

Patented June 23, 1914.
7 SHEETS—SHEET 3.

W. A. BENTON.
WEIGHT INDICATING WEIGHING APPARATUS.
APPLICATION FILED FEB. 24, 1913.

1,101,390.

Patented June 23, 1914.
7 SHEETS—SHEET 5.

W. A. BENTON.
WEIGHT INDICATING WEIGHING APPARATUS.
APPLICATION FILED FEB. 24, 1913.

1,101,390.

Patented June 23, 1914.
7 SHEETS—SHEET 6.

W. A. BENTON.
WEIGHT INDICATING WEIGHING APPARATUS.
APPLICATION FILED FEB. 24, 1913.
1,101,390.
Patented June 23, 1914.
7 SHEETS—SHEET 7.
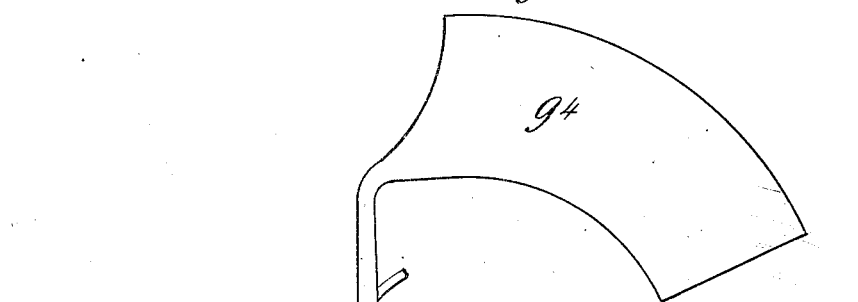
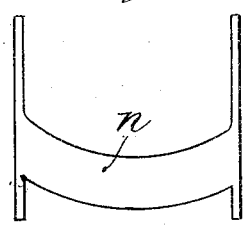
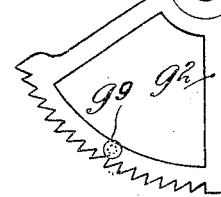
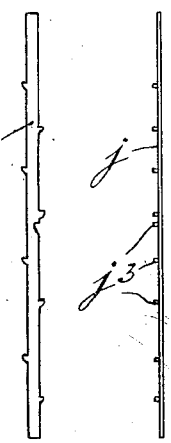
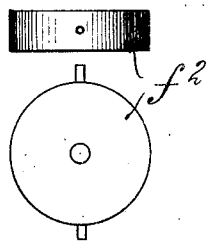
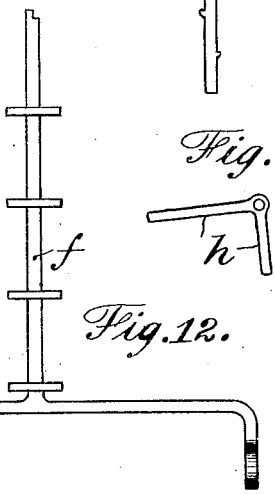
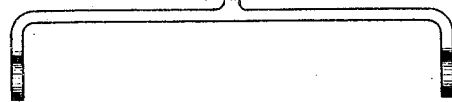
Witnesses
M. E. McDade
C. D. Kesler
Inventor
William A. Benton
by James L. Norris
Attorney

UNITED STATES PATENT OFFICE.

WILLIAM ALFRED BENTON, OF ERDINGTON, NEAR BIRMINGHAM, ENGLAND.

WEIGHT-INDICATING WEIGHING APPARATUS.

1,101,390.  Specification of Letters Patent.  Patented June 23, 1914.

Application filed February 24, 1913. Serial No. 750,429.

*To all whom it may concern:*

Be it known that I, WILLIAM ALFRED BENTON, subject of the King of Great Britain, residing at 16 Harman road, Erdington, near Birmingham, England, have invented certain new and useful Improvements in Weight-Indicating Weighing Apparatus; and I do hereby declare that the following is a full, clear, and exact description of the same.

The invention relates to weighing appliances of the kind indicating the weight of the load by the movement of a pointer over a dial or indicator, or vice versa, and combining the use of standard weights and a fractional or precision weigher such as a spring or pendulum balance.

The invention is comprised in the hereinafter described and claimed improvements, its object being to produce a scale or weighing appliance very much more accurate both in weighing and in its indications, and much less liable to derangement consequent upon changes of temperature and the wear of parts. A weighing machine of this kind has two systems of weighing operating in combination, the one system providing for the use on the weight receiving portion of the beam, or balance, of standard weights, or proportional weights if the beam or balance is unequally armed as in the case of a compound lever weighing machine, and the other system providing for the use of a spring or pendulum balance used only as a fractional weigher additional to the standard weights or proportional weights which are used in the machine to weigh the greater part of the load.

The invention provides in combination with the two systems aforesaid an additional spring or pendulum balance or other resistant automatically operative throughout the entire range of the machine as a rough weighing mechanism, from the descent of the scale pan or platform, to select the standard weights or proportional weights when the load is sufficient to need same, and to reject same if the load is insufficient and within the limits provided for in the precise and fractional weighing mechanism, the actual weighing of a load always taking place either from the fractional weighing balance, or this balance in combination with the standard and proportional weight balance.

In the machine according to the invention, when the load is placed upon the scale pan or platform it automatically selects the necessary standard weights, or proportional weights, if such are needed, or indicates which of such weights are necessary for use, and the precise fractional weighing mechanism remains inoperative until a hand or foot operated mechanism has been brought into use to deposit the standard or proportional weights, or make them operative, so that only for the finishing of the weighing is the delicate mechanism brought into use. Arrangements are provided in the machine to always select standard weights which will compel a fine and precise weighing to take place upon the fractional weighing mechanism. Simultaneously with the selection or rejection of the standard weights and the lowering of the scale pan or platform, an indicator is moved to view at a window into a position proportional to the standard weights selected or rejected, and in combination with same a further indicator, moved only by the fractional weigher, operates to show fractional weighings.

The invention hereinbefore indicated and hereinafter particularly stated in the claims may be carried into effect in various ways dependent upon the character of scale or weighing appliance, but the accompanying drawings and the description hereinafter appearing relating thereto will particularly ascertain the nature of the improvements and their operation in a weighing machine adapted particularly for counter use.

Figure 2:
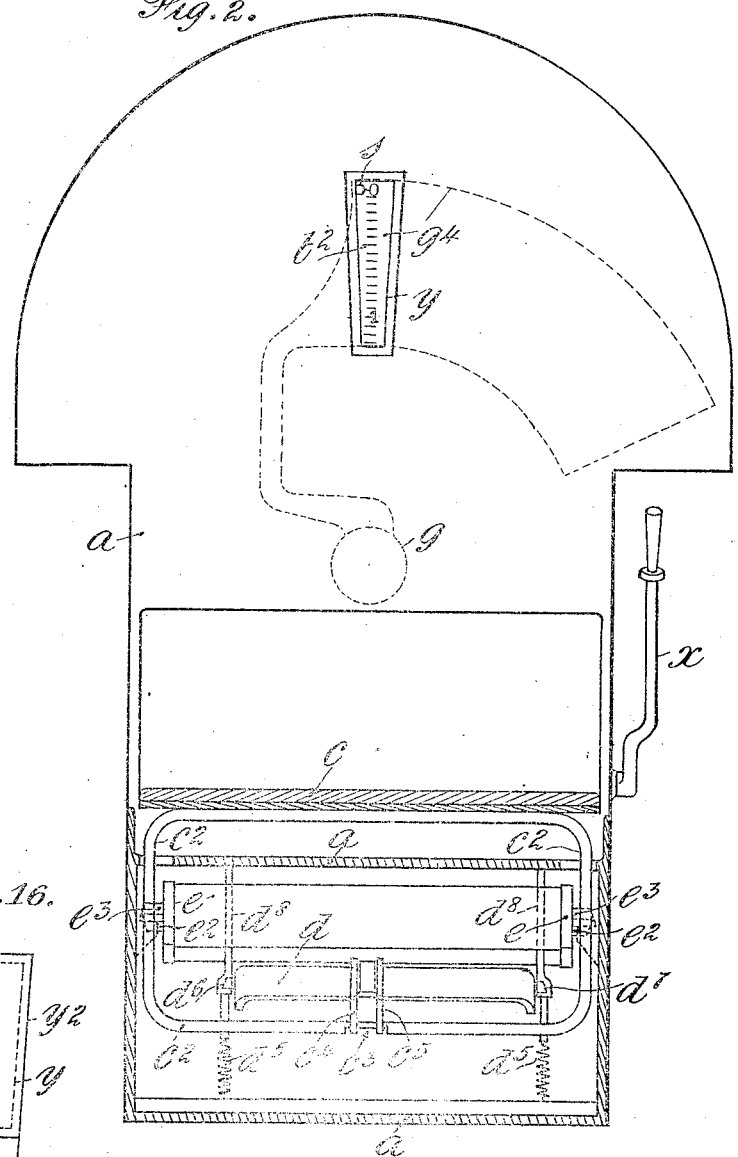
Figure 3:
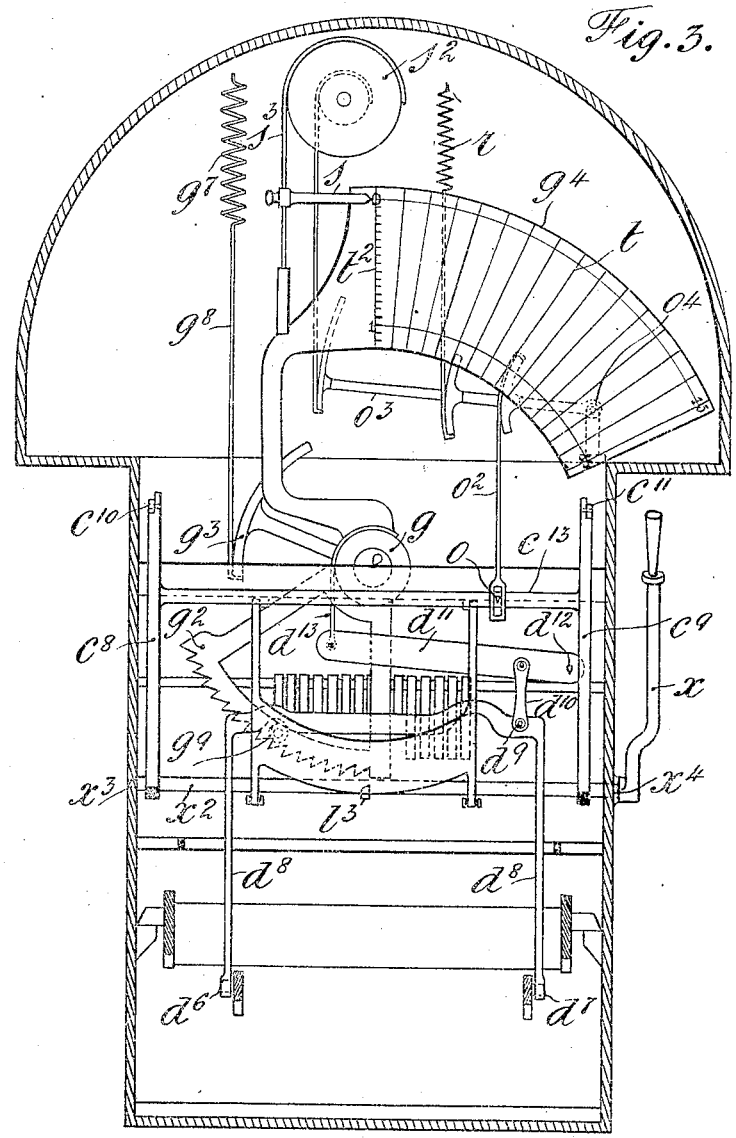
Figure 4:
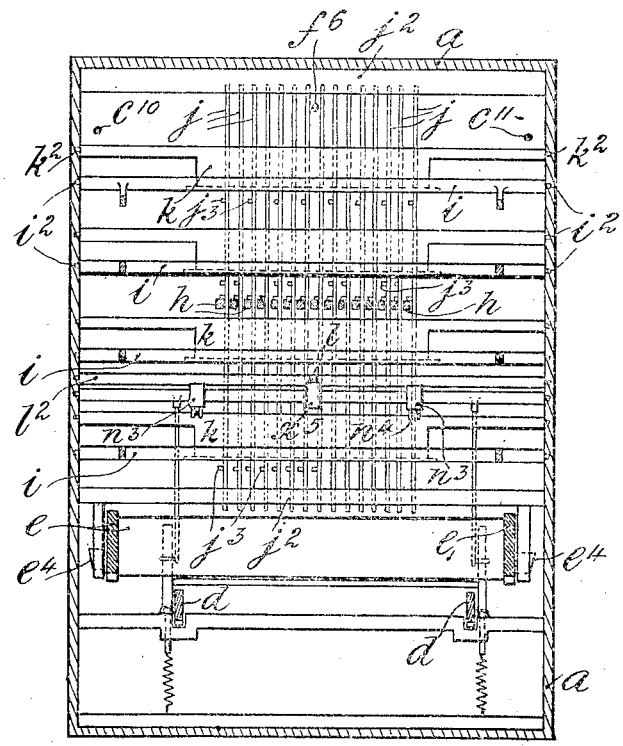
Figure 5:
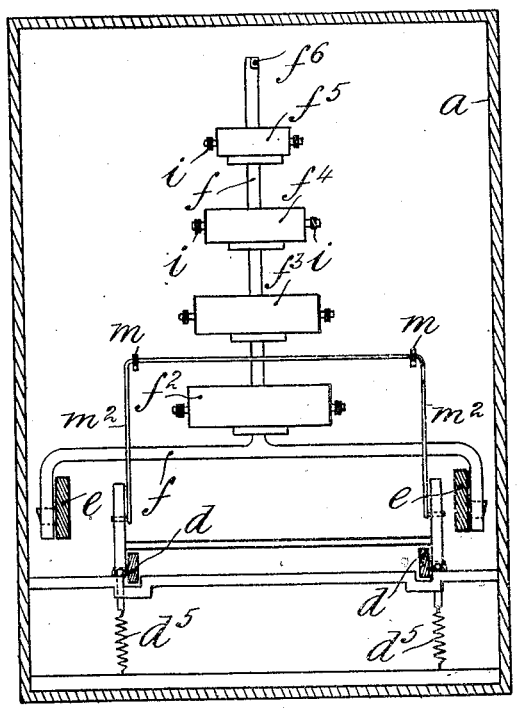
Figure 6:
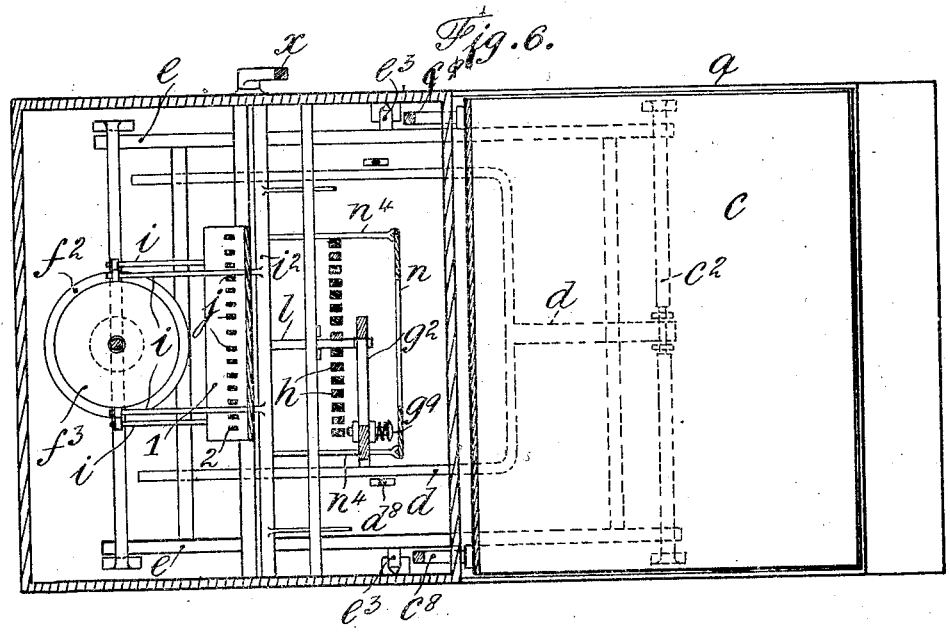
Figure 7:
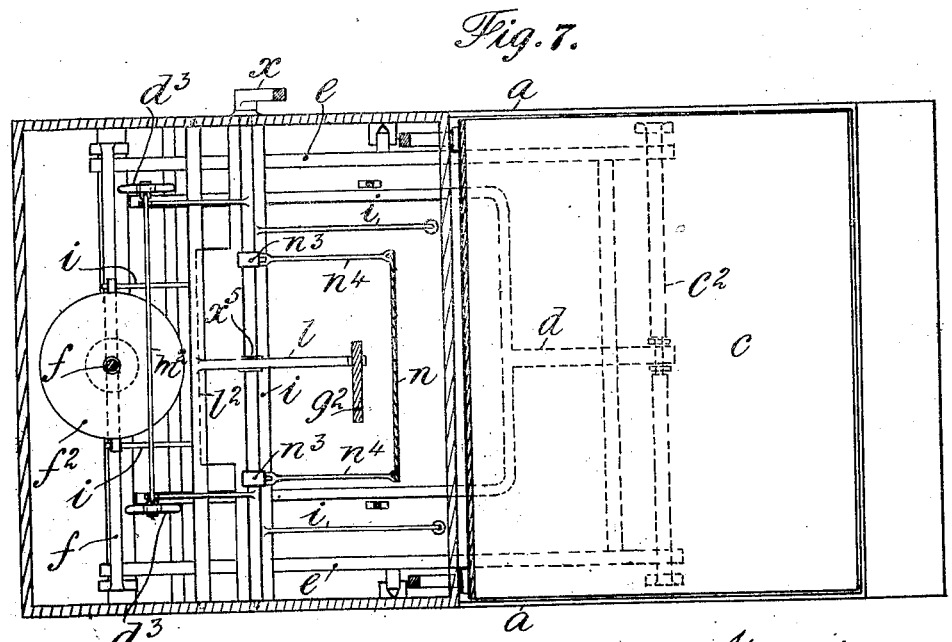

Figure 1 is a sectional elevation of a machine longitudinal of the weighing beam. Fig. 2 is a vertical section of Fig. 1 on the dotted lines A B, looking to the left. Fig. 3 is a vertical section of Fig. 1 on the dotted lines C D, also looking to the left. Fig. 4 is a vertical section of Fig. 1 on the dotted lines E F, looking to the left. Fig. 5 is a vertical section of Fig. 1 on the dotted lines G H, looking to the left. Fig. 6 is a sectional plan of Fig. 1 on the dotted lines I J. Fig. 7 is a sectional plan of Fig. 1 on the dotted lines K L. Figs. 8 to 16 show separate views of certain parts of the machine.

The exterior casing of the machine is represented at $a$, and same incloses the whole of the working parts except the weighing platform $c$, and the hand lever $x$, said casing being provided at $y\ y$ with windows to view the weight indicator.

The platform $c$ is supported below by a frame, $c^2$, the greater part of which works within the casing, the lower member of said frame being pivotally connected at $c^3$ with a rough weighing beam, $d$, by slotted links $c^4$ and $c^5$. The pivot connections are knife-edged, as also are almost all the pivot connections in the machine. Said frame also has a knife-edged pivot connection at $c^6$ with the weighing beam proper $e$, but gaps $c^7$ in said frame and the position of the knife-edge pivots $e^2$ of the main beam $e$ provide for the first lowering of the platform $c$ without any contact of the frame with said main beam $e$. The main pivots of the beam $e$ are provided at $e^3$, and those for connection with the standard weight receiver $f$ at $e^4$.

The machine is designed as a sixteen pounds scale for standard weights up to fifteen pounds and a fractional, or precision, weigher to the extent of one pound, or a little more, and therefore $f^2$ is an eight pound standard weight, $f^3$ a four pound, $f^4$ a two pound, and $f^5$ a one pound. These weights, although surrounding the receiver $f$, may be normally just lifted clear, as will be hereinafter described, so that until the receiver $f$ is lifted to take up the standard weights, the latter have no influence upon the main beam $e$.

The rough weighing beam $d$ is fulcrumed at $d^2$ $d^2$ within bearing pieces $d^3$ $d^3$ normally resting upon a cross bar $d^4$ rigid with the casing, said bearing pieces being held down to the cross bar by the springs $d^5$. The spring anchoring of this end of the beam $d$ is so that at a period in the weighing this particular end of said beam can be lifted, to temporarily relieve said beam of weight from the frame $c^2$, and also to relieve the main beam $e$ of the weight of the links $c^4$ $c^5$, at which time the weight of said frame $c^2$ is wholly upon the main beam $e$, the slots in the links $c^4$ $c^5$ permitting said links to move downwardly beyond the lower knife-edge pivot which is carried by the lower member of the frame $c^2$, as clearly shown by Fig. 2.

At about its middle, the first weighing beam $d$ is knife-edged pivoted, at $d^6$ $d^7$, to the legs of an inverted V-shaped link $d^8$, the central portion of which is pivotally connected at $d^9$ to another link $d^{10}$, which at its other end is pivoted to a lever $d^{11}$ suitably fulcrumed to the frame at $d^{12}$. This lever $d^{11}$ is, by a flexible cord $d^{13}$, connected up to a rocking drum, $g$, attached to which are a ratchet toothed sector $g^2$, a plain sector $g^3$, and an indicator $g^4$. The drum $g$ is knife-edge pivoted to the frame bars $g^5$ and $g^6$ of the machine, and when rocked by the downward swinging of the lever $d^{11}$, the toothed sector $g^2$ swings to the right, the plain sector $g^3$ swings downwardly, and the indicator $g^4$ swings to the left, all against the action of the first weighing spring or resistant $g^7$, which by a cord or the like $g^8$ is connected to the plain sector $g^3$. The toothed sector $g^2$, the plain sector $g^3$, and the indicator $g^4$ are shown separately in front elevation in Fig. 8. The spring $g^7$ is calculated to rough weigh, by extension all loads placed upon the platform $c$ and generally control the automatic setting of the two weighing systems proper, that is to say dependent upon the extension of said spring are the standard weights chosen or rejected, as will be hereinafter described, but the precise or fractional weigher is always brought into a set position to become operative by the subsequent hand operation of the lever $x$. Any suitable resistant may be substituted for the spring $g^7$. The operation of this part of the mechanism will be hereinafter clearly described.

The downward movement of the platform $c$ is rendered perfectly vertical by rigid frame bars $c^8$ $c^9$, extending inwardly and upwardly at the back of the platform and rigidly connected by a cross rod $c^{13}$, and these bars are connected at their upper ends to swinging anchoring rods $c^{10}$ $c^{11}$ pivoted at $c^{21}$ to stationary portions of the casing $a$. A similar anchoring rod $f^6$ is used for the same purpose in respect of the standard weight receiver, $f$, to insure its movement being always truly vertical.

The ratchet toothed sector $g^2$ carries a movable spring controlled stud $g^9$ which is operatively common to a number of bell-crank levers $h$ suitably fulcrumed at $h^2$ to the casing of the machine, said stud being normally held clear of said levers $h$ by its spring. As the machine is designed to weigh up to sixteen pounds, and the aggregate standard weights used in the machine total fifteen pounds, there are fifteen of such levers controlling the four standard weights and the combinations to be obtained from them, leaving always the fractional weighing, anywhere within and up to sixteen ounces, to be effected by the fractional weighing mechanism, to be hereinafter described. The standard weights $f^2$, $f^3$, $f^4$ and $f^5$ are each normally poised by a lever $i$, so as to exert no influence upon the weight receiver $f$. Each lever $i$ is fulcrumed at $i^2$ within the casing, and is operated upon by a spring $i^3$ which is accurately tensioned or powered to just poise the weight. The upper three of such levers are broken away in Fig. 1. For each bell-crank lever $h$ there is provided a lifter rod, $j$, working at its ends in suitable guiding holes $j^2$ of the casing. Such a lifter rod is shown separately in Fig. 14, and by a modification in construction only in Fig. 15, and it will be seen that each rigidly carries a number of pegs $j^3$ to operate against the levers $i$ and also against a number of smaller levers, $k$, fulcrumed to the casing at $k^2$, for locking the levers $i$. The lifter rod shown in Fig. 14 is an edge view of the one clearly seen in Fig. 1, and same carries nine pegs $j^3$, a peg for each locking lever $k$, a peg for each lever $i$, and a peg for the particular bell-crank lever, $h$, to operate against. When this particular rod is lifted by its bell-crank lever, it first rocks all the locking levers $k$ out of their operative positions, as shown, to inoperative positions, (one is shown in dotted lines in Fig. 1), so that the four levers $i$ may be afterward rocked, by the continued upward movement of the lifter rod, to lift all four standard weights $f^2$, $f^3$, $f^4$ and $f^5$ clear of their rests or supports on the weight receiver $f$. The next lifter rod in order carries only seven pegs, so that when this particular lifter rod is moved by its bell-crank lever $h$, the three lower levers $i$ and their locking levers only are operated to lift their standard weights from the weight receiver, the one standard weight $f^5$ being allowed to remain in its normal position to subsequently become operative in the weighing proper. Calling the first mentioned lifter rod number one, and the second number two, the third rod carries seven pegs, the fourth five, the fifth seven, the sixth five, the seventh five, the eighth three, the ninth seven, the tenth five, the eleventh five, the twelfth three, the thirteenth five, the fourteenth three, and the fifteenth three. These pegs control the standard weights so that one or any combination of them from one to fifteen pounds, (the weights form members of a series of weight values in geometrical progression), may become operative upon the weight receiver $f$, or all them become inoperative, leaving the fractional weighing, within the limits of one pound, to be always performed upon the precise weighing mechanism hereinafter described. The locking levers $k$ are provided to prevent the levers $i$ following up the movement of those standard weights chosen to become operative upon the weight receiver $f$.

In Fig. 6, the standard weights $f^3$ and $f^2$ only are shown, and two of the levers $i$, each lever comprising a pair of arms, one on each side of the weight, a fulcrum bar, and a pair of forwardly extending arms to which the springs $i^3$ are connected. The fulcrum bar $i^2$ of the upper lever is clearly shown, but the fulcrum bar of the under lever $d$ is underneath the upper fulcrum bar. Each lifter rod $j$ moves vertically through a clearance hole in a plate-like part, I, which forms a portion of each lever $i$, and against the underside of which the pegs of the lifter rod operate, and against the top side of which the locking lever $k$ operates. The lifter rod shown in Fig. 1 for lifting all the weights out of action, (so that all the weights are rejected), is indicated, in Fig. 6, by the numeral 2, and is the number one lifter rod. The second lifter rod lifts all the standard weights from the receiver $f$ except the pound weight $f^5$. The third lifter rod lifts all the standard weights from the receiver $f$ except the two pound weight $f^4$. The fourth lifter rod lifts the weights $f^2$ and $f^3$ from the receiver and leaves the other two in operation. The fifth lifter rod lifts the weights $f^2$, $f^4$ and $f^5$ from the receiver and leaves the weight $f^3$ in operation. The sixth lifter rod lifts the weights $f^2$ and $f^4$, the seventh lifter rod lifts the weights $f^2$ and $f^5$, the eighth lifter rod lifts the weight $f^2$ only, the ninth lifter rod lifts the weights $f^3$, $f^4$ and $f^5$; and so on up to the fifteenth lifter rod which lifts only the weight $f^5$, leaving fourteen pounds in standard weights on the weight receiver $f$. Under a load exceeding fifteen pounds no lifter rod is needed, as all the weights are to be left on the receiver $f$.

The hand-operated lever $x$ is mounted upon the one end of a rocking bar, $x^2$, having suitable bearings in the casing at $x^3$ $x^4$. This rocking bar carries a cam $x^5$ adapted to rock an arm $l$, suitably pivoted at $l^2$ to the casing and carrying an inclined tooth $l^3$, so that said tooth engages and disengages the ratchet teeth of the sector $g^2$. The rocking bar $x^2$ also carries two arms, $m$, $m$, connected by a link, $m^2$, with the bearing pieces, $d^3$, $d^3$, so that when the arms $m$ $m$ are lifted the bearing pieces $d^2$ $d^3$ are lifted. Before this lifting of the bearing pieces takes place, however, the tooth $l^3$ has been made to engage the sector, in $g^2$, to lock said sector's position, and the selected standard weights have been left operative upon the weight receiver, $f$, by the movement of stud $g^0$ to operate the particular bell-crank lever, $h$, said stud being struck by a swingable hammer plate, $n$, pivoted to the casing at $n^2$ and connected with the rocking bar $x^2$ by arms $n^3$ and links $n^4$. After these operations have been completed the bearing pieces, $d^3$, $d^3$, are then lifted the particular end of the first weighing beam $d$ is raised, the other end of said beam being lowered to relieve the weight of the links $c^4$ $c^5$ from the main beam $e$, using the pivots $d^5$ $d^5$ as fulcra.

Previous to the lifting of the end of the first weighing beam from the cross bar $d^4$ there is no contact between the bearing surfaces $c^6$ of the frame $c^2$ and the knife edges of the pivots $e^2$, $e^2$, but immediately said lifting has taken place such contacts are made, by the further lowering of the platform $c$, to thereby transfer the weight of the load from the rough weighing beam $d$ to the main beam $e$. This further lowering of the platform causes a knife-edge projection $o$ on the rod $c^{13}$ to pull down a cord connector $c^2$ and downwardly swing a lever $c^3$ to which are connected the precision or fractional weighing spring $r$ and pointers $s$ $s$, which latter travel downwardly across the faces of the indicator $g^4$. The lever $o^3$ is pivoted at $o^4$ to the casing, and in its downward movement partly revolves a drum $s^2$ over which the pointer carrying bands $s^3$ work. The precision weighing mechanism aforesaid is the last operated in the sequence of operations in the machine, as will be hereinafter made clear.

The indicator $g^4$ has indications on both faces to suit the two pointers $s, s$, so that the indicated weight can be read both from the front and rear of the machine through the windows $y$ $y$. The indications on the indicator are represented in pounds by the radial lines $t$ representing standard weights used in the machine, and the indications at right angles to these lines, as at $t^2$, represent ounces and fractions thereof chosen by the pointers $s$ $s$, and recorded by the precision weighing resistant $r$.

Separate views of the following parts are shown in the drawings, namely, of the bell-crank lever $h$ in Fig. 13, of the standard weight receiver $f$ in Fig. 12, of one of the standard weights in Fig. 11, of one of the locking levers $k$ in Fig. 10, and of the hammer plate $n$ in Fig. 9.

The sequence of operations in the machine is as follows: The placing of the load upon the scale pan $c$ automatically selects the standard weight or weights for use on the receiver $f$, and also moves the indicator $g^4$ in front of the windows $y$ $y$. This constitutes the first or rough weighing of the load from the resistant $g^7$, and may show said rough weighing at the windows. The placing of the load upon the scale pan $c$ depresses the frame, $c^2$, and rocks the first weighing beam $d$ to pull down the link, $d^8$, $d^8$, and thereby cause the lever $d^{11}$ to move the toothed sector $g^2$ and the indicator $g^4$, and to extend the first weighing spring or resistant $g^7$, the primary idea being to rock the toothed sector $g^2$ into a position corresponding to the load to be weighed to automatically choose the right bell-crank lever $h$ of the series, so that the stud $g^9$ shall subsequently actuate that lever $h$ to manipulate the standard weights in respect of the receiver $f$, always leaving sixteen ounces of the load, or any fraction thereof, to be weighed by the precision weigher, as hereinafter described; this first weighing therefore automatically selects the correct standard weights, or combination of weights, to be used for the weighing proper of the load or rejects all of them. At this period in the operations, the whole weight of the load is on the beam $d$ against the resistant or first weighing spring $g^7$. As an example, assuming the load is eleven pounds ten ounces, the toothed sector $g^2$ is automatically moved against the action of the resistant spring $g^7$, so that the stud $g^9$ comes approximately opposite the bell-crank lever $h$ designed to lift the corresponding lifter rod raising the four pounds standard weight $f^3$ only, the other three standard weights $f^2$, $f^4$, and $f^5$ remaining normal. Simultaneously the indicator $g^4$ is moved across the windows $y$ $y$ to such an extent as to bring the eleven pounds mark opposite, although at such time the windows may be closed by shutters, as will be hereinafter explained. The hand lever $x$ is now operated, and the first part of its movement, through the cam $x^5$, forces the tooth $l^3$ into engagement with the opposite tooth of the sector $g^2$, to thereby lock said sector in such position; and here it is to be pointed out that the tooth $l^3$ and the teeth of the sector are arranged to come together by inclined planes in the act of locking, so that if the said sector is moved a little farther by the weight of the load than is necessary to select the proper bell-crank lever to allow the subsequent fractional weighing to take place on the precision weigher, said sector is set back, so that the standard weight or weights selected for use will be always less than the actual weight of the load. The locking of the sector fixes the position of the stud $g^9$, and cuts out the effect of the first weighing spring $g^7$, so that once the standard weights are chosen, or rejected, if the load is a pound or less, said spring has no further influence on the weighing. The continued operation of the hand lever $x$ now causes the hammer plate $n$ to strike the stud $g^8$ to rock the particular bell-crank lever $h$ it is opposite and lift the corresponding lifter rod $j$ to raise the standard weight $f^3$ out of action and leave the remaining three standard weights in their normal positions to be subsequently used, the load being still upon the first weighing beam $d$. Further operation of the hand lever, after the aforesaid has taken place, lifts the arms $m$ and the adjacent end of the first weighing beam $d$, which has the effect of transferring the load to the weighing beam-proper $e$, said load lowering slightly during the transference and, by pulling down the rigid frame bars $e^8$ $e^6$ and the rod $e^{13}$, rocking the lever $o^3$ to move the pointers $s$ $s$, against the action of the precision weighing resistant $r$, down the radial settings of the indicator, such movement of the pointers showing clearly in ounces and fractions of ounces the weight of the load over and above the eleven pounds in standard weights now being used upon the weight-carrying end of the main beam $e$. The full operation of the hand lever $x$ has now taken place, and the weight proper can be most accurately read off the indicator at the windows.

All weighings within the scope of the machine are carried out in exactly the same manner, and it will be quite clear that the machine can be designed within reason to weigh within almost any limits, either in a most delicate manner or in a less delicate manner, dependent upon the substance or article to be weighed.

In order to prevent fraud and make it impossible for the weighing machine to show at the windows a weight indication greater than that corresponding to the load, a very delicately poised shutter may be provided to close the windows under certain conditions. The shutter normally tends to uncover the windows, but is held from doing so by two stops, or equivalents, one of which is automatically moved when the standard weights are selected by placing the load on the platform, and the other of which is removed precisely at the actual weighing, so that the windows are not uncovered until the actual weighing is complete. If now, even while the sector $g^2$ is locked, a portion of the load is taken off to leave said load less in weight than the standard weights used, the natural lifting of the platform of the main beam will automatically operate the shutter to close the windows and read, if desired, "Weigh again" or "Incorrect weight." A diagram of this shutter mechanism is represented by Fig. 16, wherein $y$ indicates one of the windows shown in Figs. 1 and 2, and $y^2$ a shutter opening and closing same. The knife-edge pivot of the shutter is at $y^3$ to bear on the casing, and $y^4$ is a weighted arm rigidly attached to the shutter. $y^5$ is the one stop, and $y^6$ is the other stop, the first named stop in the form of a rod, and the second stop in the form of a lever worked by the rod $y^7$. The rod $y^7$ is connected to the hand operated mechanism for locking the selecting mechanism and bringing the standard weights into use, and the stop $y^5$ is connected to the scale pan or platform. The shutter $y^2$ may bear the words "Weigh again" or "Incorrect weight" and normally, by the weighted arm $y^4$, takes up a position opening the windows.

Having now described my invention what I claim and desire to secure by Letters Patent is:—

1. In a weight-indicating machine, the combination of an accurate-weighing mechanism embodying a series of weights, the weight values of which are arranged in geometrical progression, and a fractional-weighing device, a platform; a rough-weighing mechanism connected with said platform for operation by the latter during its initial descent; weight-selecting mechanism connected to the rough-weighing mechanism; and manually-operated mechanism operative subsequent to the rough-weighing operation for rendering the selected weights and the fractional-weighing device operative for the accurate weighing, and for locking the rough-weighing mechanism against action.

2. In a weight-indicating machine, the combination of an accurate-weighing mechanism embodying a series of weights, the weight values of which are arranged in geometrical progression, and a fractional-weighing device; a platform; a rough-weighing mechanism connected with said platform for operation by the latter during its initial descent; weight-selecting mechanism connected to the rough-weighing mechanism; and manually-operated mechanism operative subsequent to the rough-weighing operation for rendering the selected weights and the fractional-weighing device operative for the accurate weighing.

3. In a weight-indicating machine, the combination of an accurate-weighing mechanism embodying a series of weights, the weight values of which are arranged in geometrical progression, and a fractional-weighing device; a platform; a rough-weighing mechanism connected with said platform for operation by the latter during its initial descent; weight-selecting mechanism connected to the rough-weighing mechanism; and manually-operated mechanism operative subsequent to the rough-weighing operation for rendering the selected weights and the fractional-weighing device operative simultaneously for the accurate weighing, and for locking the rough-weighing mechanism against action.

4. In a weight-indicating machine, the combination of an accurate-weighing mechanism embodying a series of weights and a fractional-weighing device; a platform; a rough-weighing mechanism operatively connected with the platform; weight-selecting mechanism associated with the rough-weighing mechanism; and manually-operated means operative subsequently to the rough-weighing operation to actuate said fractional-weighing device and, also, to render operative any of said weights which may have been selected, and to lock the rough-weighing mechanism against action.

5. In a weight-indicating machine, the combination of an accurate-weighing mechanism; a platform; a rough-weighing mechanism; and manually-operated mechanism operative subsequent to the rough-weighing operation for rendering the accurate weighing mechanism operative, and for locking the rough-weighing mechanism against action.

6. In a weight-indicating machine, the combination, with a series of weights and a fractional-weighing device; of a platform; a rough-weighing mechanism connected with said platform for operation by the latter during its initial descent; weight-selecting mechanism connected to the rough-weighing mechanism; and manually-operated mechanism operative subsequent to the rough-weighing operation for rendering the selected weights and the fractional-weighing device operative, and for locking the weight-selecting mechanism in position during the operation of said selected weights and said fractional-weighing device.

7. In a weight-indicating machine, the combination, with a series of weights and a fractional-weighing device; of a platform; a rough-weighing mechanism connected with said platform for operation by the latter during its initial descent; weight-selecting mechanism connected to the rough-weighing mechanism; and manually-operated mechanism operative subsequent to the rough-weighing operation for rendering the selected weights and the fractional-weighing device operative, and for simultaneously locking the weight-selecting mechanism in position and rendering the rough-weighing mechanism inoperative during the operation to actuate said fractional-weighing device and, also, to render operative any of said weights which may have been selected.

8. In a weight-indicating machine, the combination, with a series of weights; of a platform; a rough-weighing mechanism connected with said platform for operation thereby during its initial descent; weight-selecting mechanism associated with the rough-weighing mechanism; and manually-operated means operative subsequent to the rough-weighing operation for rendering operative any of said weights which may have been selected.

9. In a weight-indicating machine, the combination, with a series of weights; of a platform; a rough-weighing mechanism connected with said platform for operation thereby during its initial descent; weight-selecting mechanism associated with the rough-weighing mechanism; and manually-operated means operative subsequent to the rough-weighing operation for rendering operative any of said weights which may have been selected, and for automatically locking the weight-selecting mechanism against movement.

10. In a weight-indicating machine, the combination of an accurate-weighing mechanism embodying a series of weights and a fractional-weighing device; a platform; a rough-weighing mechanism operatively connected with the platform; weight-selecting mechanism associated with the rough-weighing mechanism; manually-operated means operative subsequently to the rough-weighing operation to actuate said fractional-weighing device and, also, to render operative any of said weights which may have been selected; an indicator; a shutter normally covering the indicator; and means for automatically operating the shutter to uncover said indicator at the completion of the accurate-weighing operation.

11. In a weight-indicating machine, the combination of an accurate-weighing mechanism embodying a series of weights and a fractional-weighing device; a platform; a rough-weighing mechanism operatively connected with the platform; weight-selecting mechanism associated with the rough-weighing mechanism; manually-operated means operative subsequently to the rough-weighing operation to actuate said fractional-weighing device and, also, to render operative any of said weights which may have been selected; an indicator; a shutter for covering and uncovering the indicator; means for normally holding the shutter in position to cover the indicator; and means controlled by said manually-operated mechanism for automatically releasing said holding means from said shutter at the conclusion of the accurate-weighing operation, to uncover said indicator.

12. In a weight-indicating machine, the combination, with a load-receiving member, a weighing-mechanism, and manually-operated means for rendering said mechanism operative; of a weight-indicator; a shutter for covering and uncovering the indicator; and a pair of stops for normally holding said shutter in position to cover said indicator, said stops being connected one to said load-receiving member and the other to said manually-operated means for successive operation by the same, to release said shutter and uncover said indicator at the completion of the weighing operation, whereby removal of a portion of the load from said member prior to the completion of such member will return said shutter to closed position.

Signed at Birmingham, in the county of Warwick, England, this twelfth day of February 1913.

WILLIAM ALFRED BENTON.

Witnesses:
C. W. HENRY,
BERNARD H. TINGLE.